United States Patent
Kobayashi et al.

(10) Patent No.: US 10,721,425 B2
(45) Date of Patent: Jul. 21, 2020

(54) SOLID-STATE IMAGING DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventors: Seishi Kobayashi, Yokohama Kanagawa (JP); Kenji Hasegawa, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/276,923

(22) Filed: Feb. 15, 2019

(65) Prior Publication Data
US 2020/0059621 A1    Feb. 20, 2020

(30) Foreign Application Priority Data

Aug. 14, 2018    (JP) .................................. 2018-152606

(51) Int. Cl.
*H04N 5/3745* (2011.01)
*H04N 5/372* (2011.01)
*H04N 5/369* (2011.01)
*H04N 5/376* (2011.01)

(52) U.S. Cl.
CPC ....... *H04N 5/37457* (2013.01); *H04N 5/3692* (2013.01); *H04N 5/3765* (2013.01); *H04N 5/37206* (2013.01)

(58) Field of Classification Search
CPC ............. H04N 5/37457; H04N 5/3765; H04N 5/3692; H04N 5/37206
See application file for complete search history.

(56) References Cited

U.S. PATENT DOCUMENTS

| | | |
|---|---|---|
| 8,854,517 B2 | 10/2014 | Honda et al. |
| 9,060,143 B2 | 6/2015 | Honda et al. |
| 9,832,409 B2 | 11/2017 | Kawahito et al. |
| 9,848,143 B2 | 12/2017 | Honda et al. |
| 2015/0296160 A1* | 10/2015 | Tominaga ......... H01L 27/14609 348/322 |
| 2016/0353045 A1* | 12/2016 | Kawahito ......... H01L 27/14806 |
| 2017/0374303 A1 | 12/2017 | Honda et al. |

FOREIGN PATENT DOCUMENTS

| | | |
|---|---|---|
| JP | 2007-208805 A | 8/2007 |
| JP | 2014-017834 A | 1/2014 |
| WO | 2015-119243 A1 | 8/2015 |

* cited by examiner

*Primary Examiner* — Christopher K Peterson
(74) *Attorney, Agent, or Firm* — White & Case LLP

(57) ABSTRACT

A solid-state imaging device in an embodiment is a solid-state imaging device including an output circuit configured to amplify signals read out from a plurality of pixels. The solid-state imaging device includes a logic circuit configured to generate operation timing of the output circuit and a delay generation circuit configured to control a delay amount for adjusting a pulse generated by the logic circuit to optimum timing. The delay generation circuit is configured of a first variable delay circuit configured to generate a delay pulse, a reference clock of which is delayed by a reference delay amount, a control circuit configured to control the first variable delay circuit and calculate, as a digital signal, a delay code corresponding to the reference delay amount, and a second variable delay circuit configured to adjust the timing of the pulse using the delay code.

13 Claims, 3 Drawing Sheets

SOLID-STATE IMAGING DEVICE

CROSS-REFERENCE TO RELATED APPLICATION

This application is based upon and claims the benefit of priority from the prior Japanese Patent Application No. 2018-152606 filed on Aug. 14, 2018; the entire contents of which are incorporated herein by reference.

FIELD

Embodiments described herein relate generally to a solid-state imaging device.

BACKGROUND

A linear image sensor is a solid-state imaging device that one-dimensionally reads image information, converts the image information into an analog signal, and outputs the analog signal in time series. The linear image sensor is known as a device essential for reading an image such as a facsimile, a digital copying machine, or an image scanner.

According to demands for an increase in speed in image forming apparatuses such as a digital copying machine, an increase in speed during image reading is also demanded in the linear image sensor that reads image information.

DETAILED DESCRIPTION

An image processing device in an embodiment is a solid-state imaging device including an output circuit configured to amplify and output signals read out from a plurality of pixels that photoelectrically convert incident light. The solid-state imaging device includes: a logic circuit configured to generate operation timing of the output circuit; and a delay generation circuit configured to control a delay amount for adjusting timing of a pulse generated by the logic circuit. The delay generation circuit is configured of a first variable delay circuit configured to generate a delay pulse, a reference clock of which is delayed by a reference delay amount, a control circuit configured to control the first variable delay circuit and calculate, as a digital signal, a delay code corresponding to the reference delay amount, and a second variable delay circuit configured to adjust the timing of the pulse using the delay code.

An embodiment is explained below with reference to the drawings.

Figure 1:
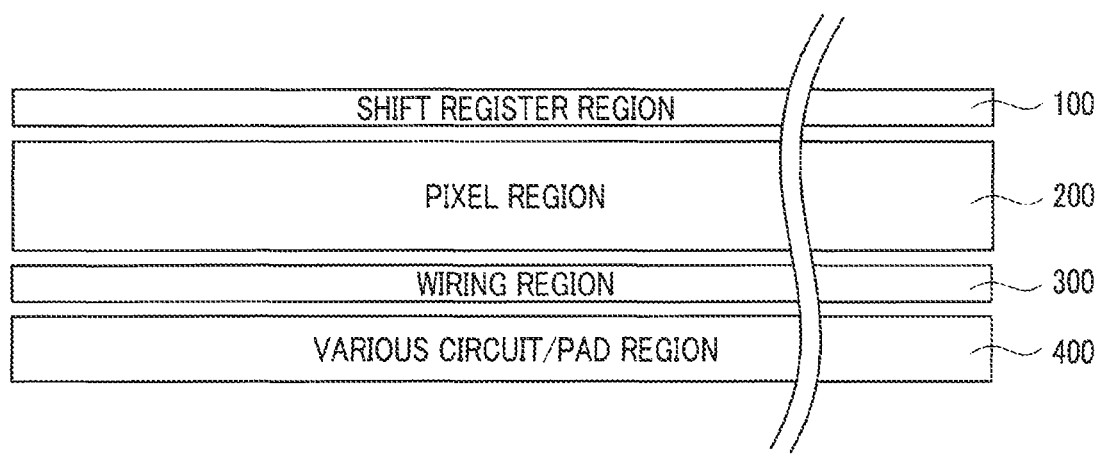
FIG. 1 is a schematic block diagram showing an example of a configuration of a solid-state imaging device according to an embodiment.
Figure 2:
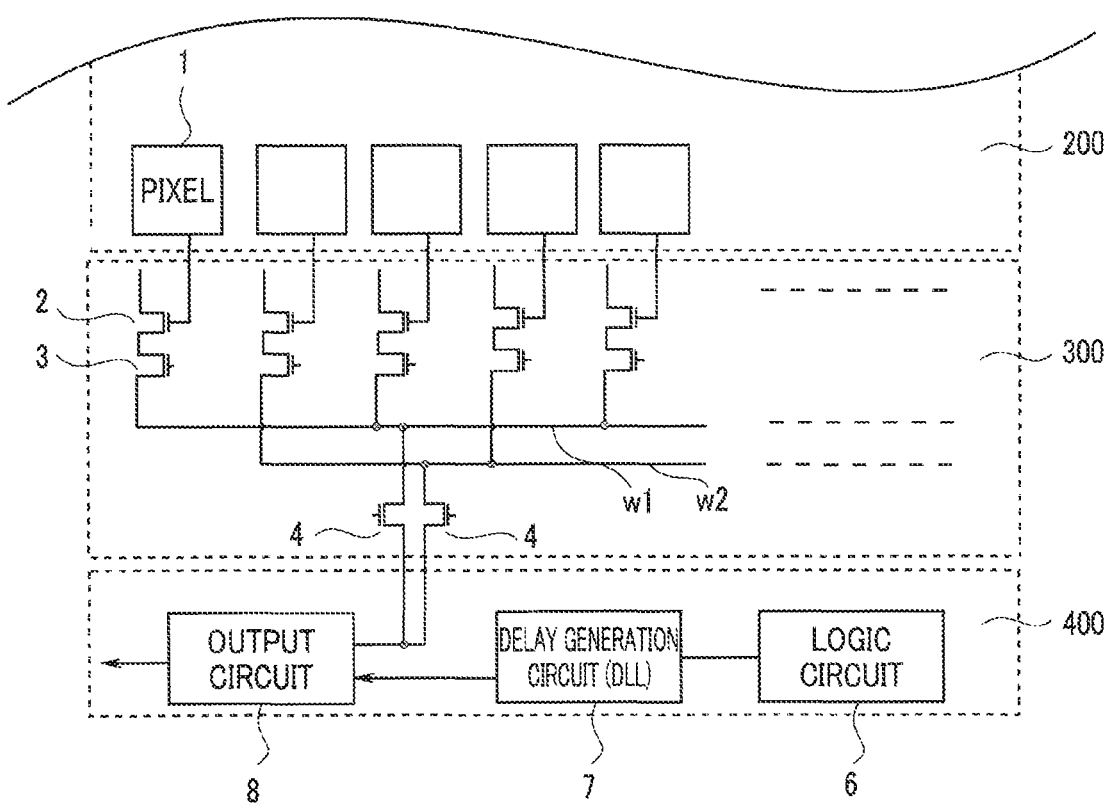
FIG. 2 is a diagram showing main configurations of respective regions of the solid-state imaging device.

FIG. 1 is a schematic block diagram showing an example of a configuration of a solid-state imaging device according to the present embodiment. FIG. 2 is a diagram showing main configurations of respective regions of the solid-state imaging device. The solid-state imaging device according to the present embodiment is a linear image sensor having an elongated shape (a narrow strip shape), a short side of which is extremely small compared with a long side as shown in FIG. 1. The solid-state imaging device is divided into four regions in a latitudinal direction. That is, the solid-state imaging device is divided into long and thin four regions (a shift register region 100, a pixel region 200, a wiring region 300, and a various circuits/PAD region 400) extending across a longitudinal-direction width of the solid-state imaging device.

As shown in FIG. 2, in the pixel region 200, a plurality of pixels (light receiving elements) 1 are one-dimensionally arrayed and formed at predetermined intervals over substantially the entire longitudinal-direction width of the solid-state imaging device. The pixels 1 are configured of, for example, photodiodes, reset transistors, and modulation transistors. The photodiodes, which are photoelectric conversion elements, generate optically generated charges according to incident light. The transistors for modulation modulate the optically generated charges into voltages and output the voltages as pixel signals. That is, the pixels 1 output signals (pixel signals) corresponding to incident light.

In the wiring region 300, a plurality of amplifier transistors 2 are disposed. The amplifier transistors 2 are amplifier circuits disposed to the respective plurality of pixels 1. That is, the amplifier transistors 2 as many as the pixels 1 are disposed in the wiring region 300. The amplifier transistors 2 are electrically connected to the pixels 1 corresponding to the amplifier transistors 2. The amplifier transistors 2 amplify and output pixel signals inputted from the pixels 1.

A plurality of address transistors 3 are also disposed in the wiring region 300. Like the amplifier transistors 2, the address transistors 3 are pixel-signal readout switches disposed to the respective plurality of pixels 1. That is, the address transistors 3 as many as the pixels 1 are disposed in the wiring region 300. Sources of the address transistors 3 are connected to output terminals of the amplifier transistors 2 that amplify the pixel signals of the pixels 1 corresponding to the amplifier transistors 2. Drains of the address transistors 3 are connected to one of signal lines w1 and w2 connected to an output circuit 8.

Gates of the address transistors 3 are connected to shift registers formed in the shift register region 100. Line selection pulses supplied from the shift registers are applied to the address transistors 3, whereby outputs of the amplifier transistors 2 are outputted, via the address transistors 3, to the signal lines w1 and w2 connected to the output circuit 8. For example, the drains of the address transistors 3 disposed in odd number rows are connected to the signal line w1. The drains of the address transistors 3 disposed in even number rows are connected to the signal line w2. In this way, the plurality of address transistors 3 are sequentially driven by the shift registers, whereby the pixel signals outputted from the pixels 1 are sequentially read out to the signal lines w1 and w2.

Further, two switch transistors 4a and 4b are also disposed in the wiring region 300. A source of the switch transistor 4a is connected to the signal line w1. A drain of the switch transistor 4a is connected to the output circuit 8. A source of the switch transistor 4b is connected to the signal line w2. A drain of the switch transistor 4b is connected to the output circuit 8. A selection signal is inputted to a gate terminal of one of the switch transistors 4a and 4b, which are output selection switches, whereby a signal on the selected signal line of the signal line w1 and the signal line w2 is inputted to the output circuit 8.

In the various circuits/PAD region 400, a logic circuit 6, a delay generation circuit 7, and the output circuit 8 are mainly disposed. The output circuit 8 applies necessary various kinds of processing such as amplification to signals selected and inputted by the switch transistors 4a and 4b and thereafter outputs the signals to an external image signal processing circuit (not shown in FIG. 2). The output circuit 8 performs, on the basis of a timing pulse obtained by adjusting a pulse generated by the logic circuit 6 to optimum timing in the delay generation circuit 7, signal processing such as setting and sampling of reference potential to image signals outputted from the respective pixels 1.

Figure 3:
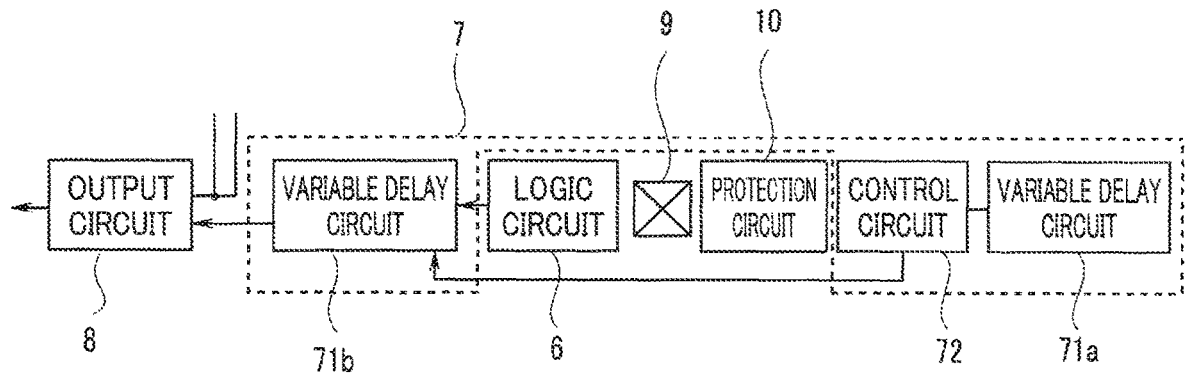
FIG. 3 is a schematic block diagram showing a layout configuration of a various circuits/PAD region.

FIG. 3 is a schematic block diagram showing a layout configuration of the various circuits/PAD region. In the various circuits/PAD region 400, a pad 9 and a protection circuit 10 are also provided besides the logic circuit 6, the delay generation circuit 7, and the output circuit 8 explained above. The pad 9 is a connection terminal formation region for input and output for electrically connecting various circuits on an inside to a circuit on an outside. The protection circuit 10 is provided to electrically separate an input-and-output section from the various circuits on the inside and protect an internal circuit from circuit destruction and malfunction due to noise intruding from the input-and-output section and static electricity.

Figure 4:
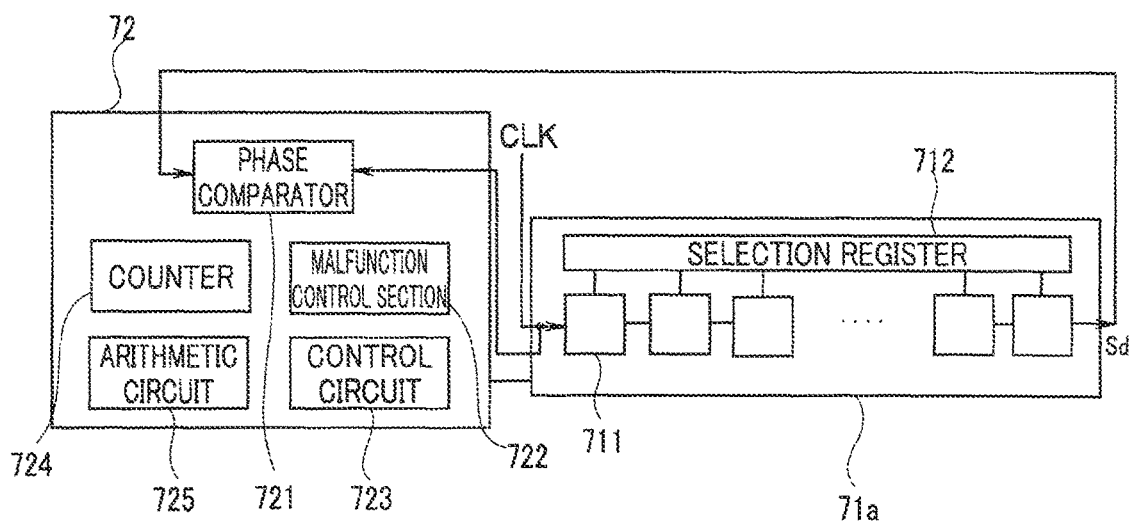
FIG. 4 is a diagram showing a detailed configuration of a delay generation circuit according to the embodiment.

FIG. 4 is a diagram showing a detailed configuration of the delay generation circuit according to the present embodiment. As shown in FIG. 4, the delay generation circuit 7 is configured of two variable delay circuits 71a and 71b and the control circuit 72. The variable delay circuit 71a delays a clock signal CLK, which is an input signal, and outputs a delay signal Sd. The control circuit 72 executes measurement and calculation of a delay amount and generates a delay code. The variable delay circuit 71b adjusts a timing pulse generated by the logic circuit 6 to an optimum timing pulse using the delay code inputted from the control circuit 72. Note that detailed explanation of the configuration is omitted since the variable delay circuit 71b has the same configuration as a configuration of the variable delay circuit 71a.

The variable delay circuit 71a is configured of a large number of delay elements 711 connected in series and a selection register 712. The delay elements 711 are, for example, buffer circuits configured of NAND circuits or inverter circuits. All the delay elements 711 have the same configuration. Delay times of signals in the respective delay elements 711 are substantially the same. Control signals are inputted to the respective delay elements 711 from the selection register 712. A value of "0" or "1" is set to the control signals. Only a control signal inputted to one delay element 711 among the plurality of delay elements 711 connected in series is set to "1" and control signals inputted to the other delay elements 711 are set to "0".

The variable delay circuit 71a causes an input signal to pass from the delay element 711 in a first stage to the delay element 711 to which the control signal "1" is inputted and outputs the input signal as the delay signal Sd. For example, when a control signal inputted to the delay element 711 in an eighth stage is set to "1" and control signals inputted to the other delay elements 711 are set to "0", the input signal passes from the delay element 711 in the first stage to the delay element 711 in the eighth stage to be delayed by a delay time for the eight stages and outputted. In this case, the input signal is not transmitted to the delay elements 711 in ninth and subsequent stages. Therefore, by designating a stage number to which the control signal "1" is inputted, a position of the delay element 711 that outputs the delay signal Sd is determined and the delay time is set.

The control signals inputted to the respective delay elements 711 are generated by the selection register 712 on the basis of a delay code outputted from the control circuit 72. For example, a delay code for designating a delay amount in the variable delay circuit 71a, to which delay elements in 256 stages are connected, is 8-bit digital data.

The selection register 712 decodes the 8-bit delay code, sets a value inputted to one control signal line among 256 control signal lines connected to the respective delay elements 711 in the 256 stages to "1", and sets values inputted to the other control signal lines to "0". For example, when "00001010" is inputted to the selection register 712 as a delay code, a value inputted to a control signal line connected to the delay element 711 in a tenth stage is set to "1" and values inputted to the other control signal lines are set to "0". In this case, the delay signal Sd having a delay time for ten stages of the delay elements is outputted.

A configuration of the variable delay circuit 71a is not limited to the configuration explained above. A delay circuit having another configuration known in general may be used.

Figure 5:
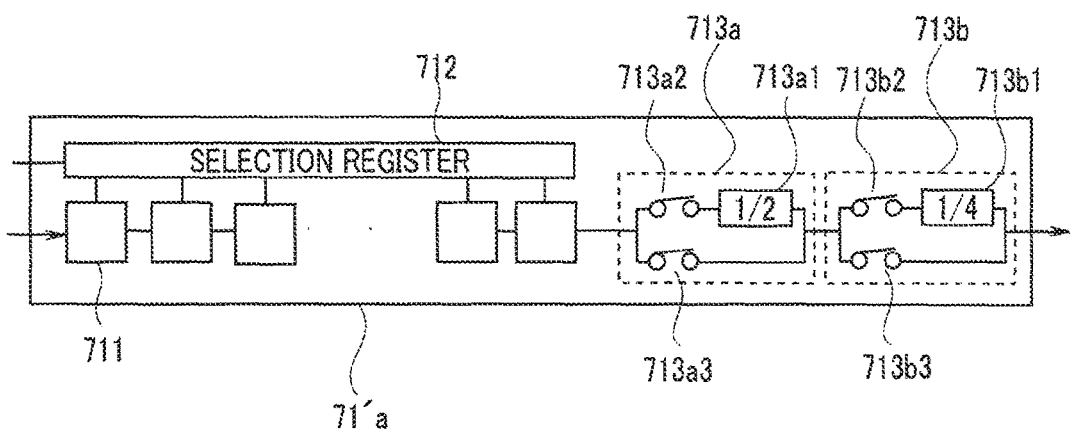
FIG. 5 is a diagram showing another configuration of a variable delay circuit.

As shown in FIG. 5, a variable delay circuit 71'a with delay resolution improved by disposing a weighting element by a delay difference may be used. FIG. 5 is a diagram showing another configuration of a variable delay circuit. The variable delay circuit 71'a shown in. FIG. 5 is configured by connecting, in series, on an output side of a large number of delay elements 711 connected in series, a first resolution switching circuit 713a capable of multiplying an input signal by ½ and outputting the input signal and a second resolution switching circuit 713b capable of multiplying an input signal by ¼ and outputting the input signal.

The first resolution switching circuit 713a is a switching circuit configured by connecting, in parallel, a first path configured by directly connecting a changeover switch 713a2 and a weighting element 713a1 that multiplies an input signal by ½ and outputs the input signal and a second path in which only a changeover switch 713a3 is disposed. One of a changeover switch 713a2 and the changeover switch 713a3 is controlled to ON and the other is controlled to OFF according to desired resolution.

The second resolution switching circuit 713b is a switching circuit configured by connecting, in parallel, a first path configured by directly connecting a changeover switch 713b2 and a weighting element 713b1 that multiplies an input signal by ¼ and outputs the input signal and a second path in which only a changeover switch 713b3 is disposed. One of the changeover switch 713b2 and the changeover switch 713b3 is controlled to ON and the other is controlled to OFF according to desired resolution.

A delay resolution multiple is determined by a sum of magnification of the first resolution switching circuit 713a and magnification of the second resolution switching circuit 713b. For example, when it is desired to double resolution, the first resolution switching circuit 713a sets the changeover switch 713a2 to ON and sets the changeover switch 713a3 to OFF and the second resolution switching circuit 713b sets the changeover switch 713b3 to ON and sets the changeover switch 713b2 to OFF. That is, the resolution can be doubled by causing delay signals outputted from the delay elements 711 in multiple stages to pass through the weighting element 713a1.

For example, when it is desired to quadruple resolution, the first resolution switching circuit 713a sets the changeover switch 713*a*2 to ON and sets the changeover switch 713*a*3 to OFF and the second resolution switching circuit 713*b* sets the changeover switch 713*b*2 to ON and sets the changeover switch 713*b*3 to OFF. That is, the resolution can be quadrupled by causing delay signals outputted from the delay elements 711 in multiple stages to pass through the weighting element 713*a*1 and the weighting element 713*b*1.

The number of stages of the resolution switching circuits 713*a* and 713*b* disposed in the variable delay circuit 71'*a* is not limited to two but may be one or may be three or more. The magnification of the weighting elements 713*a*1 and 713*b*1 disposed in the resolution switching circuits 713*a* and 713*b* is not limited to two and four but may be other magnification.

The control circuit 72 that generates a delay code is configured of a phase comparator 721, a malfunction control section 722, a control circuit 723, a counter 724, and an arithmetic circuit 725. The phase comparator 721 detects a phase difference with respect to a reference signal of the delay signal Sd using an input signal (=a clock signal CLK) to the variable delay circuit 71*a* as a reference signal. The malfunction control section 722 monitors a waveform of the delay signal Sd outputted from the variable delay circuit 71*a* to thereby detect presence or absence of a failure and malfunction in the delay element 711. When the delay element 711 can be restored to a normal operation, the malfunction control section 722 performs a necessary control instruction.

The counter 724 counts the number of the delay elements 711 through which the control signal Sd passes (the number of stages of the delay element 711 that generates a delay time). The arithmetic circuit 725 calculates a required delay amount.

The control circuit 723 adjusts a delay code on the basis of a phase difference detection result outputted from the phase comparator 721. That is, when a phase of the delay signal Sd advances with respect to the reference signal, the control circuit 723 increases the delay code. When the phase of the delay signal Sd delays with respect to the reference signal, the control circuit 723 reduces the delay code. When the phases of the delay signal Sd and the reference signal coincide, the control circuit 723 determines that lock is completed and outputs the delay code to the variable delay circuit 71*b*.

That is, first, the delay generation circuit 7 replaces, using the variable delay circuit 71*a* and the control circuit 72, a time for one clock of the reference clock with the number of stages of the delay element 711 and digitizes the number of stages as the delay code. The variable delay circuit 71*b* creates a predetermined delay amount using the digitized delay code and adjusts the timing pulse generated by the logic circuit 6 to an optimum timing pulse.

Detailed plane disposition of various circuits configuring the various circuits/PAD region 400 including the delay generation circuit 7 configured in this way is explained in detail below. As shown in FIG. 3, the circuits are one-dimensionally arrayed substantially in parallel to the longitudinal direction of the various circuits/PAD region 400. In FIG. 3, an example is shown in which the various circuits are one-dimensionally arrayed in the order of the output circuit 8, the variable delay circuit 71*b*, the logic circuit 6, the pad 9, the protection circuit 10, the control circuit 72, and the variable delay circuit 71*a*.

A delay generation circuit that controls and generates a delay amount using an analog signal easily receives interference from other signals and a power supply. It is necessary to provide a specific area or include a dedicated power supply or PAD to prevent the delay generation circuit from being affected by noise from other circuits. On the other hand, in the delay generation circuit 7 in the present embodiment, the variable delay circuits 71*a* and 71*b* and the control circuit 72 are configured of digital circuits. Therefore, the delay generation circuit 7 can operate with only a power supply voltage or a around voltage. A dedicated power supply or PAD is unnecessary. Therefore, compared with the delay generation circuit in the past that uses an analog signal, it is possible to reduce limitations of shielding, a distance, and the like in a layout of a power supply and signals.

Further, the delay generation circuit 7 in the present embodiment processes the predetermined delay amount as the delay code, which is a digital signal. The digital signal has high noise resistance compared with the analog signal. Therefore, it is unnecessary to dispose, close to each other, the variable delay circuit 71*a* and the control circuit 72 that perform measurement and calculation of a delay amount and the variable delay circuit 71*b* that adjusts the timing pulse generated by the logic circuit 6 to an optimum pulse. Therefore, flexibility of a layout increases. Since the delay generation circuit 7 has extremely high robustness against malfunction and various characteristic deteriorations, as shown in FIG. 3, it is possible to dispose various circuits such as the logic circuit 6, the pad 9, and the protection circuit 10 between the control circuit 72 and the variable delay circuit 71*b*. The various circuits can be one-dimensionally disposed substantially in parallel to the longitudinal direction of the various circuits/PAD region 400. Therefore, it is possible to reduce a driving timing change without affecting the chip size of the short side.

Figure 6:
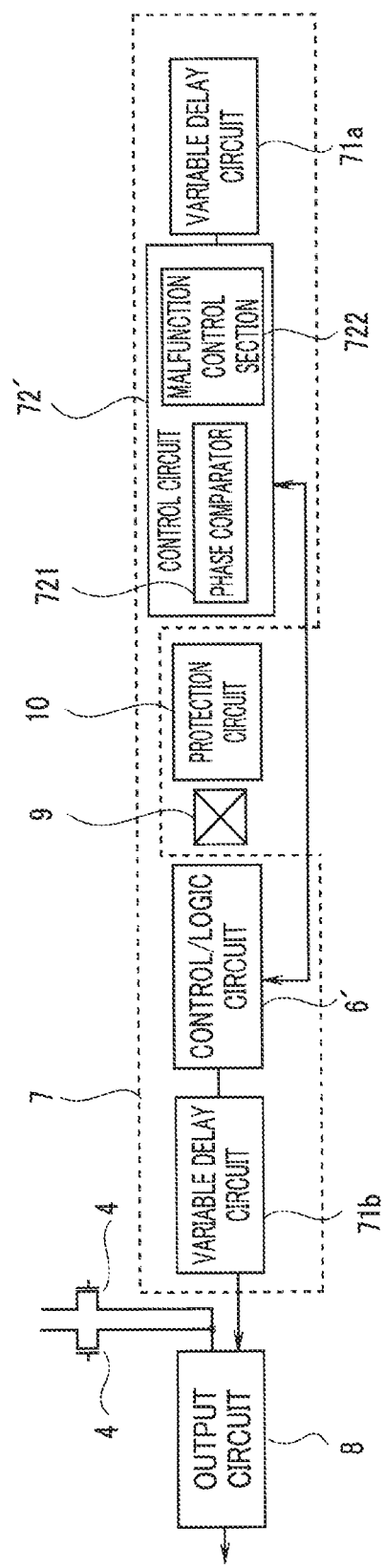
FIG. 6 is a schematic block diagram showing another layout configuration of the various circuits/PAD region.

A disposition configuration of the delay generation circuit 7 is not limited to the configuration explained above. The delay generation circuit 7 can be divided and redisposed according to characteristics of the respective components. FIG. 6 is a schematic block diagram showing another layout configuration of the various circuits/PAD region. In FIG. 6, components of a control circuit 72' and components of a control/logic circuit 6' are different from the components of the control circuit 72 and the logic circuit 6 shown in FIG. 4. The other components and disposition configurations of the elements are the same as the configuration shown in FIG. 4. Therefore, the components are denoted by the same reference numerals and signs and explanation of the components is omitted.

The control circuit 72' shown in FIG. 6 is disposed in the same position as the position of the control circuit 72 shown in FIG. 4. The control circuit 72' includes, among the components of the control circuit 72, blocks requiring high sensitivity characteristics to monitor a waveform of the delay signal Sd, that is, the phase comparator 721 and the malfunction control section 722. On the other hand, the circuits such as the control circuit 723, the counter 724, and the arithmetic circuit 725, which are the other components of the control circuit 72, are disposed in the control/logic circuit 6'. The control/logic circuit 6' shown in FIG. 6 is disposed in the same position as the position of the logic circuit 6 shown in FIG. 4.

That is, among the components of the control circuit 72, blocks requiring high sensitivity characteristics with respect to the delay signal Sd need to be disposed near the variable delay circuit 71*a* that measures a reference delay amount. The blocks do not have to be disposed in direct contact with the variable delay circuit 71*a* if the blocks are disposed in a range in which the necessary sensitivity characteristics are satisfied. That is, the range in which the blocks satisfy the sensitivity characteristics required for the delay signal Sd is defined as a vicinity region.

On the other hand, among the components of the control circuit 72, the circuits (the control circuit 723, the counter 724, and the arithmetic circuit 725) that can be configured as logic circuit for performing control processing of a digital signal and do not require high sensitivity characteristics for the delay signal Sd only have to be disposed in a region where the circuits is operable within fixed timing rather than in the vicinity of the variable delay circuit 71a.

Further, the circuits that can be configured as the logic circuits that perform the control processing of the digital signal, that is, the circuits such as the control circuit 723, the counter 724, and the arithmetic circuit 725 can be treated as logic circuits that can be generated on an RTL basis. Therefore, by disposing the circuits in the same region as the region of the logic circuit 6 shown in FIG. 4, it is possible to collectively lay out the circuits using a P&R (place and route), which is a logic circuit automatic layout device.

In this way, among the components of the control circuit 72, the circuits that has the low sensitivity characteristics and can be configured as the logic circuits that perform the control processing of the digital signal are disposed in the same region as the region of the logic circuit 6 and collectively generated on the RTL basis. Consequently, it is possible to reduce overhead of a disposition wiring region and further reduce an area of the various circuits/PAD region 400. Therefore, it is possible to reduce a driving timing change without affecting the chip size of the short side.

In general, readout of a signal in the linear image sensor is performed as explained below. First, charges accumulated in a pixel, which is a photoelectric conversion element, are converted into a voltage by an amplifier and thereafter sequentially read out to a signal line by an address transistor. The read-out signal is selected to be outputted to an output circuit by a switching transistor. After necessary amplification is performed, the signal is outputted from the linear image sensor.

The output circuit adjusts setting of reference potential, sampling of signals, and the like outputted from the respective pixels to be optimum timing pulses in a delay circuit on the basis of a pulse signal generated by a logic circuit and performs signal processing.

In increasing a speed of the linear image sensor, optimization of the timing pulses is important. That is, according to the timing adjustment in the delay circuit, operation speed is determined in a region where characteristic deterioration of the sensor does not occur. However, these timing pulses fluctuate according to a manufacturing process of the delay circuit, an applied voltage, temperature, and the like. Therefore, it is difficult to realize a high-speed operation.

To solve this problem, it is useful to use, as the delay circuit, a feedback circuit based on a reference clock such as a DLL (delay locked loop) or a PLL (phase locked loop). The DLL and the PLL arc easily affected by interference from other signals and a power supply. Therefore, it is necessary to provide a specific area or provide a dedicated power supply or a PAD to prevent noise from being received from other circuits. However, chip cost increases in the linear image sensor having the elongated shape with the short side extremely small compared with the long side if a size of the short side is increased.

According to the embodiment explained above, the predetermined delay amount used in the delay generation circuit 7 is processed as the delay code, which is the digital signal. Since the digital signal has high noise resistance compared with the analog signal, it is unnecessary to dispose, close to each other, the variable delay circuit 71a and the control circuit 72 that perform measurement and calculation of a delay amount and the variable delay circuit 71b that adjusts the timing pulse generated by the logic circuit 6 to an optimum pulse. Therefore, flexibility of a layout increases. Since the delay generation circuit 7 has extremely high robustness against malfunction and various characteristic deteriorations, it is possible to dispose the various circuits such as the logic circuit 6, the pad 9, and the protection circuit 10 between the control circuit 72 and the variable delay circuit 71b. The various circuits can be disposed in the longitudinal direction of the various circuits/PAD region 400. Therefore, it is possible to reduce a driving timing change without affecting the chip size of the short side.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A solid-state imaging device including an output circuit configured to amplify and output signals read out from a plurality of pixels that photoelectrically convert incident light, the solid-state imaging device comprising:
   a logic circuit configured to generate operation timing of the output circuit; and
   a delay generation circuit configured to control a delay amount for adjusting timing of a pulse generated by the logic circuit, wherein
   the delay generation circuit is configured of a first variable delay circuit configured to generate a delay pulse, a reference clock of which is delayed by a reference delay amount, a control circuit configured to control the first variable delay circuit and calculate, as a digital signal, a delay code corresponding to the reference delay amount, and a second variable delay circuit configured to adjust the timing of the pulse using the delay code.

2. The solid-state imaging device according to claim 1, wherein the plurality of pixels are arrayed in one direction.

3. The solid-state imaging device according to claim 2, wherein the first variable delay circuit, the control circuit, the second delay circuit, and the logic circuit are arrayed in a longitudinal direction, which is the direction in which the pixels are arrayed.

4. The solid-state imaging device according to claim 1, wherein a plurality of elements configuring the control circuit are disposed according to a sensitivity characteristic for a delay signal outputted from the first variable delay circuit.

5. The solid-state imaging device according to claim 4, wherein, among the plurality of elements, a first element group configured of the elements requiring a high sensitivity characteristic for the delay signal outputted from the first variable delay circuit is disposed in a vicinity region of the first variable delay circuit.

6. The solid-state imaging device according to claim 5, wherein, among the elements configuring the control circuit, a second element group configured of the elements not included in the first element group is disposed in a mixed region with the logic circuit.

7. The solid-state imaging device according to claim 1, wherein a signal used in the delay generation circuit is a digital signal controlled by two values of a power supply voltage and a ground voltage.

8. The solid-state imaging device according to claim 1, wherein the first variable delay circuit and the second variable delay circuit have a same circuit configuration.

9. The solid-state imaging device according to claim 2, wherein a plurality of elements configuring the control circuit are disposed according to a sensitivity characteristic for a delay signal outputted from the first variable delay circuit.

10. The solid-state imaging device according to claim 9, wherein, among the plurality of elements, a first element group configured of the elements requiring a high sensitivity characteristic for the delay signal outputted from the first variable delay circuit is disposed in a vicinity region of the first variable delay circuit.

11. The solid-state imaging device according to claim 10, wherein, among the elements configuring the control circuit, a second element group configured by the elements not included in the first element group is disposed in a mixed region with the logic circuit.

12. The solid-state imaging device according to claim 11, wherein a signal used in the delay generation circuit is a digital signal controlled by two values of a power supply voltage and a ground voltage.

13. The solid-state imaging device according to claim 12, wherein the first variable delay circuit and the second variable delay circuit have a same circuit configuration.

* * * * *